(12) United States Patent
Tamir et al.

(10) Patent No.: US 9,256,441 B2
(45) Date of Patent: Feb. 9, 2016

(54) SYSTEM AND METHOD PROVIDING FORWARD COMPATIBILITY BETWEEN A DRIVER MODULE AND A NETWORK INTERFACE

(71) Applicant: Intel Corporation, Santa Clara, CA (US)

(72) Inventors: Eliezer Tamir, Bait Shemesh (IL); Boris Kleiman, Rishon le Zion (IL); Ben-Zion Friedman, Jerusalem (IL); Eliel Louzoun, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 296 days.

(21) Appl. No.: 13/659,479

(22) Filed: Oct. 24, 2012

(65) Prior Publication Data

US 2014/0112346 A1    Apr. 24, 2014

(51) Int. Cl.
*H04L 12/54* (2013.01)
*G06F 9/44* (2006.01)

(52) U.S. Cl.
CPC ................... *G06F 9/4415* (2013.01)

(58) Field of Classification Search
CPC ........................................ H04L 12/54
USPC ................ 370/419, 420, 421, 428, 429
See application file for complete search history.

(56) References Cited

U.S. PATENT DOCUMENTS

| 6,182,182 | B1 * | 1/2001 | Bradley et al. ............... 710/310 |
| 2005/0198650 | A1 * | 9/2005 | Ford et al. .................... 719/321 |
| 2008/0127165 | A1 * | 5/2008 | Mullis et al. ................. 717/173 |
| 2013/0003469 | A1 |  1/2013 | Kalkarni |

* cited by examiner

*Primary Examiner* — Ricky Ngo
*Assistant Examiner* — Wei-Po Kao
(74) *Attorney, Agent, or Firm* — Grossman, Tucker, Perreault & Pfleger, PLLC

(57) ABSTRACT

Generally, this disclosure provides systems and methods for providing forward compatibility between a driver module and one or more present or future versions of a network interface. The system may include a network interface configured to transfer data between a host system and a network; and a programmable circuit module associated with the network interface, the programmable circuit module configured to provide compatibility between the network interface and a driver module associated with the host system, wherein the driver module includes a first set of capabilities and the network interface includes a second set of capabilities.

23 Claims, 6 Drawing Sheets

SYSTEM AND METHOD PROVIDING FORWARD COMPATIBILITY BETWEEN A DRIVER MODULE AND A NETWORK INTERFACE

FIELD

The present disclosure relates to providing forward compatibility, and more particularly, to providing forward compatibility between a driver module and a network interface.

BACKGROUND

Computer systems and other devices are typically delivered to an end user with software driver modules that may be pre-installed and/or provided on accompanying storage media (e.g., shrink-wrapped compact disks). The drivers, which may provide an interface between an operating system, or other application software, and a hardware module, generally need to be operationally compatible with that hardware. The logistics associated with the manufacture and delivery of such systems often results in increased difficulty or delay in order to meet the compatibility requirements between drivers and associated hardware. This may be especially problematic when the drivers and the hardware are produced by different development groups and/or on different development schedules or timelines. Additionally, there may be requirements that an older "certified" driver be able to work with newer hardware.

Compatibility between network interface hardware and associated drivers may be particularly important since network downloads of additional software components and updates are often performed during the installation and activation of new computer systems and devices, for which a working adapter is necessary.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods for providing forward compatibility between a driver module and one or more present or future versions of a network interface configured to transfer data between a host system and a network. The term "forward compatibility" is used to indicate the ability of the current (or older) versions of a driver module to work with current and future versions of the network interface that may have features, capabilities and/or controls that were unknown or undefined when the driver module was created. The forward compatibility may be achieved through firmware abstraction of hardware data queues, or other interface mechanisms, that conceal some details or features of the newer network interface hardware from the older driver module. The abstraction of the data queues may be employed to mask or minimize differences in capabilities between the relatively static host system driver module and the evolving versions of the network interface hardware. The abstraction may include the conversion or manipulation of data descriptors associated with the data to be transferred. The firmware, which in some embodiments may be any type of programmable circuitry, is associated with the current or future network interface hardware and may therefore be compatible with the capabilities of the network interface hardware as well as the older driver module. The firmware may also be configured to enable the driver module to download driver module updates through the network interface.

Figure 1:
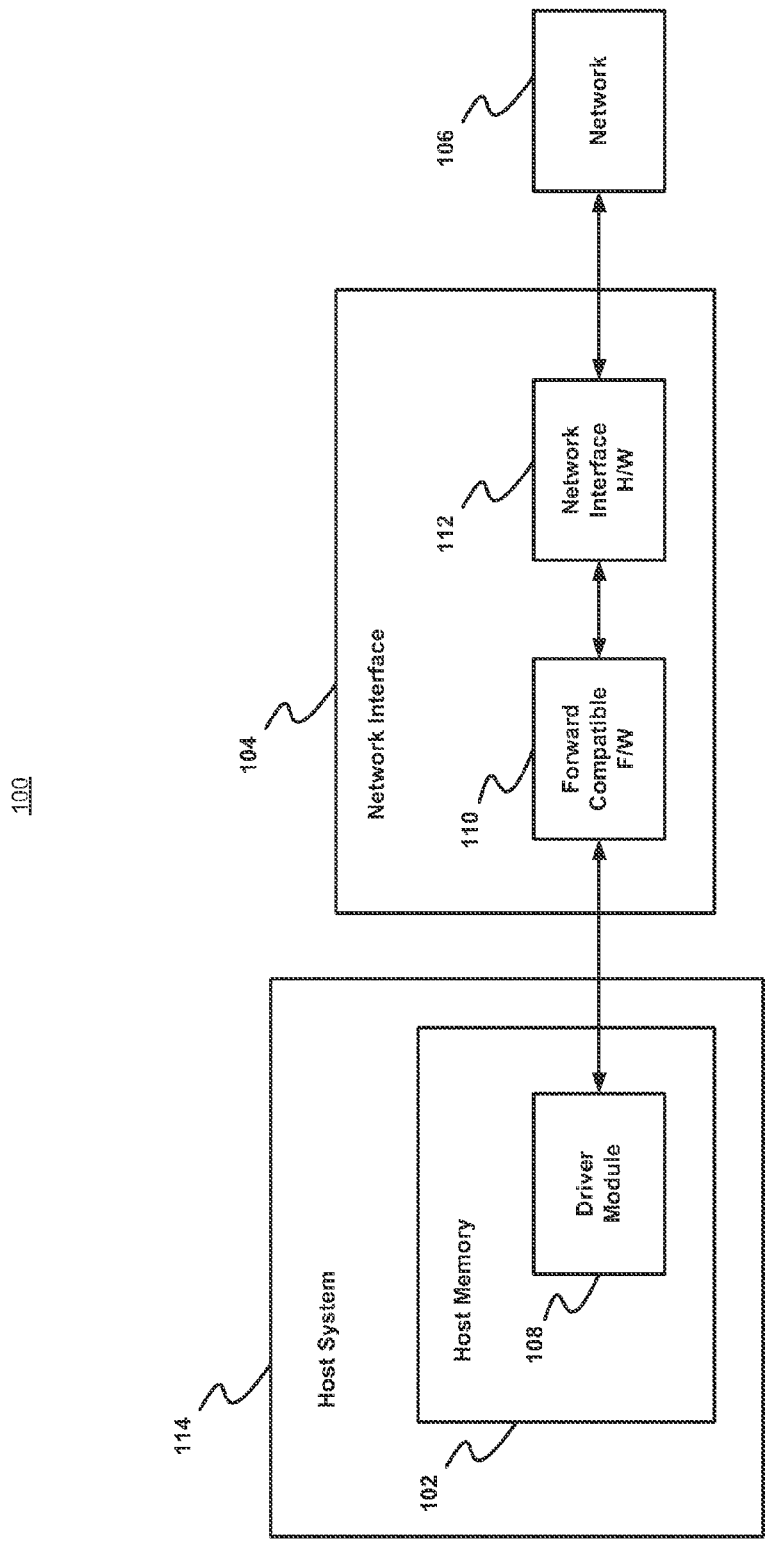
FIG. 1 illustrates a top level system diagram of one exemplary embodiment consistent with the present disclosure.

FIG. 1 illustrates a top level system diagram 100 of one exemplary embodiment consistent with the present disclosure. A network interface 104 is configured to transfer data between a host system 114 and a network 106. A network interface 104 may generally include modules to process Media Access Control (MAC) layer protocols and Physical (PHY) layer protocols. Network interface 104 may also generally include a Direct Memory Access (DMA) engine. The data transfer may be bi-directional (i.e., data transmitted to the network and/or received from the network). Host system 114 may be any type of computing system or communication device including, for example, a desktop, a workstation, a laptop, a tablet, a phone or smartphone or any type of wired or wireless platform. Host system 114 includes a driver module 108 which may reside in host memory 102. Driver module 108 may provide an interface between an operating system, or other application software, running on host system 114 and network interface 104. In some embodiments, driver module 108 may be a "basic" or generic driver that provides a reduced set of capabilities that may be limited, for example, to a core subset of functions needed for data transfer through network interface 104 or any other type of generic network interface. The reduced set of capabilities provided by driver module 108 may result in a reduced data transfer rate through network interface 104. In some embodiments, driver module 108 may have been provided for (and be compatible with) an earlier version of network interface 104.

Driver module 108 may interface with network interface 104 through the use of data descriptors, control register sets and/or any other suitable means of control, communication and/or event posting, as will be described in greater detail below. The format and usage of the data descriptors, or other communications, may change or expand over time to support new network protocols and/or more efficient data transmission hardware, for example, thus raising the issue of compatibility between older driver modules 108 and later network interfaces 104.

Network interface 104 includes a forward compatible firmware (F/W) module 110 and network interface hardware 112. F/W module 110 is configured to provide operational compatibility between driver module 108 and the current version of network interface H/W 112 as will be explained in greater detail below. The term "compatibility" is used to indicate that the driver module 108 is enabled, through F/W module 110, to work with the network interface H/W 112 to accomplish the transmission and reception of data between the host system 114 and the network 106.

In some embodiments, the provided operational compatibility may result in increased data transfer rates through network interface 104. F/W module 110 may be any type of programmable circuitry associated with network interface 104.

In some embodiments, driver module 108 may be a pre-boot driver configured to download an operating system image through network interface 104. In some embodiments, driver module 108 may download driver module updates through network interface 104.

Figure 2:
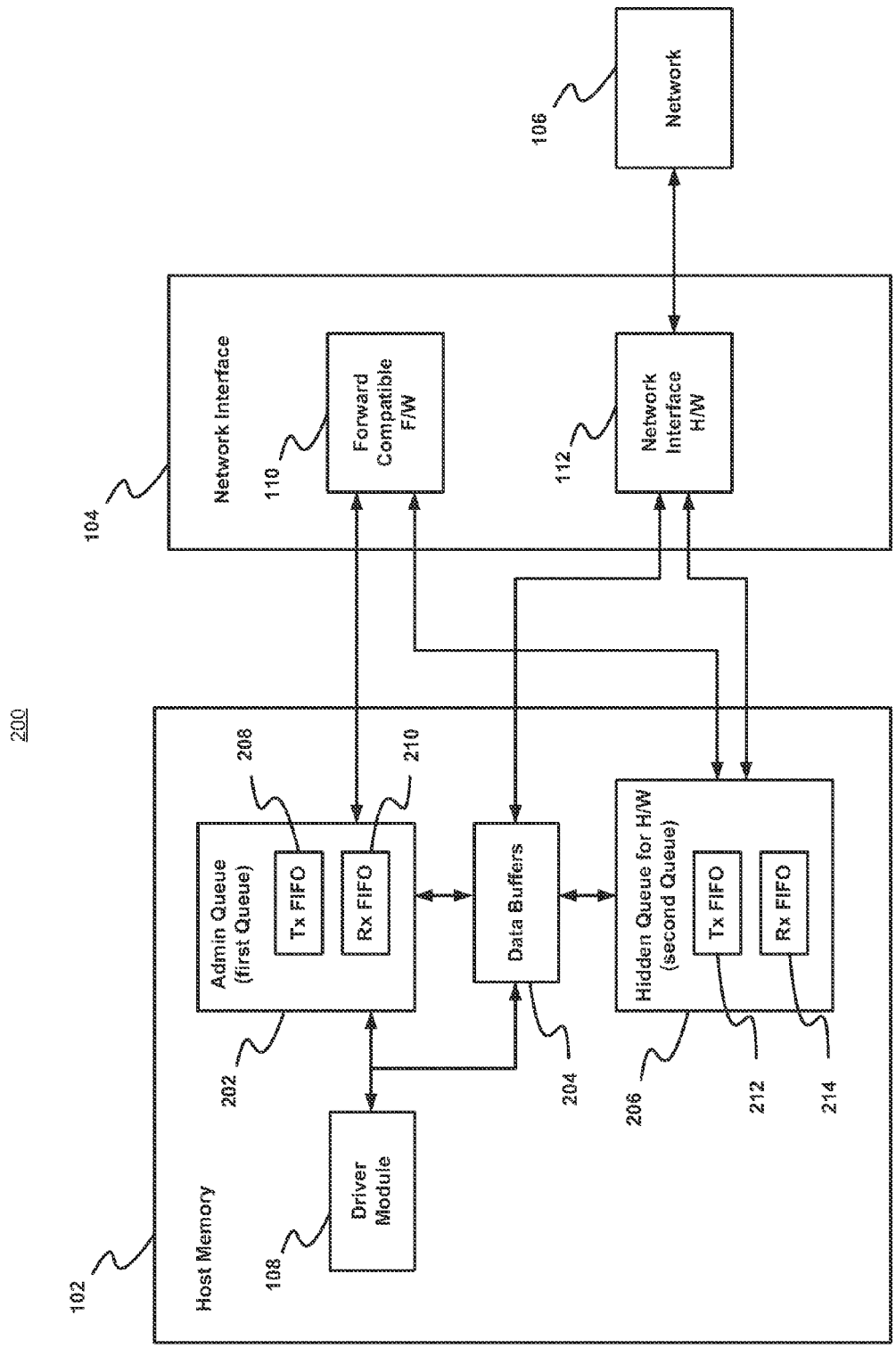
FIG. 2 illustrates a block diagram of one exemplary embodiment consistent with the present disclosure.

FIG. 2 illustrates a block diagram 200 of one exemplary embodiment consistent with the present disclosure in greater detail. Data buffers 204, which may reside in host memory 102, store data that is transferred (e.g., transmitted or received) through network interface 104. Driver module 108 maintains a first queue 202, known as an admin queue, which may also reside in host memory 102. The admin queue 202 includes a transmit FIFO (first-in-first-out data structure) 208 through which the driver may post commands and a receive FIFO 210 through which the driver may receive events. It will be appreciated that other types of data structures may be used as alternatives to the FIFOs in other embodiments.

The commands and events that are posted and received through the FIFOs 208, 210 are referred to as descriptors or data descriptors. These descriptors are associated with the data in the data buffers 204. The descriptors may include, for example, an address for the data in the data buffer, a length or size of the data, information about the type of the data (which may be organized according to a particular packet format), address offsets to various fields within the data, address offsets used for checksum calculations or any other suitable auxiliary information. The organization and format of the admin queue 202 and the descriptors stored therein is maintained by and compatible with the driver module 108.

A second queue 206 is maintained by the F/W module 110 for use by the network interface H/W 112. This second queue 206 may also reside in host memory 102 but may be concealed from the driver module 108. This second queue 206 provides a firmware abstraction of the admin queue 202 that is forward compatible with the current version of network interface H/W 112. The term "abstraction" is used to indicate that the second queue 206 may be a more generalized version of the driver specific admin queue 202 and thus suitable for use by current and/or future versions of network interface 104.

F/W module 110 may convert and copy descriptors from FIFOs 208, 210 in admin queue 202 to corresponding FIFOs 212, 214 in second (or concealed) queue 206 and/or perform any other operations necessary to provide compatibility between driver module 108 and network interface H/W 112, as will be explained in greater detail below. The conversion of the descriptors to a format that is compatible with the network interface H/W 112 enables the network interface H/W 112 to access the data buffers 204 directly. This eliminates the need for F/W module 110 to provide an intermediate buffer in the network interface 104 or to copy data between the data buffers 204 and any such intermediate buffer, resulting in increased transfer speeds and efficiency.

As new versions of network interface 104 are developed and deployed, possibly using different descriptor formats and/or queue structures to implement new features and innovations, the associated forward compatible firmware 110 will be modified to accommodate these changes while maintaining a consistent interface to the original generic or legacy driver module 108. For example, earlier versions of network interface 104 may overwrite command descriptors on the queue with completion events, while later versions of network interface 104 may use a separate queue for completion events.

In some embodiments, the compatibility provided between driver module 108 and network interface H/W 112, by firmware module 110, may enable driver module 108 to download driver module updates. The resulting updated driver module may then be directly compatible with network interface H/W 112 eliminating the need for further descriptor conversion operations by firmware module 110.

Figure 3:
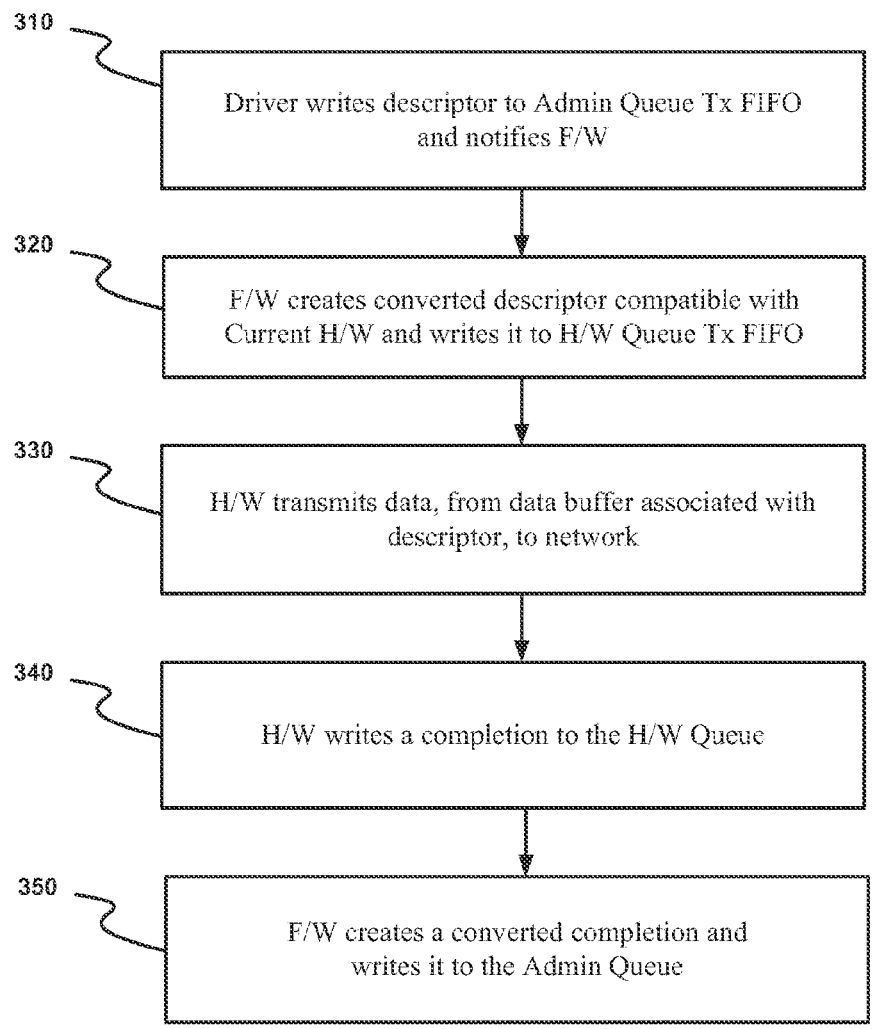
FIG. 3 illustrates a flowchart of operations of an exemplary embodiment consistent with the present disclosure.

FIG. 3 illustrates a flowchart of operations 300 of an exemplary embodiment consistent with the present disclosure. The operations describe the firmware queue abstraction process in connection with the transmission of data from the host system 114 to the network 106. At operation 310, driver module 108 writes a descriptor to the admin queue transmit FIFO 208 and notifies the F/W module 110. The notification may be accomplished, for example, by updating a tail pointer on the FIFO 208. At operation 320, the F/W module 110 reads the descriptor and creates a converted descriptor that points to the same buffer from which data is to be transmitted, but which is compatible with the current network interface H/W 112. The F/W module 110 writes the converted descriptor to the H/W queue transmit FIFO 212 and notifies the network interface H/W 112. The notification may be accomplished, for example, by updating a tail pointer on the FIFO 212.

At operation 330, the network interface H/W 112 transmits the data from the data buffer 204, as specified by the converted descriptor in FIFO 212, to the network 106. Because the data descriptor has been converted to a format compatible with the network interface H/W 112, the data transmission may be accomplished without firmware involvement (i.e., firmware does not need to access the data buffer) or the use of an intermediate data buffer. This may advantageously provide for increased transfer speed and efficiency and/or reduce the level of firmware resources that are needed.

At operation 340, the network interface H/W 112 notifies the F/W module 110 of the transmission. The notification may be accomplished, for example, by writing a completion event to the H/W queue transmit FIFO 212. In response, at operation 350, the F/W module 110 creates a converted completion event that is compatible with the driver module 108 and writes it to the admin queue transmit FIFO 208. The F/W module 110 may generate an interrupt to notify the driver module 108 that the operation has been completed.

Figure 4:
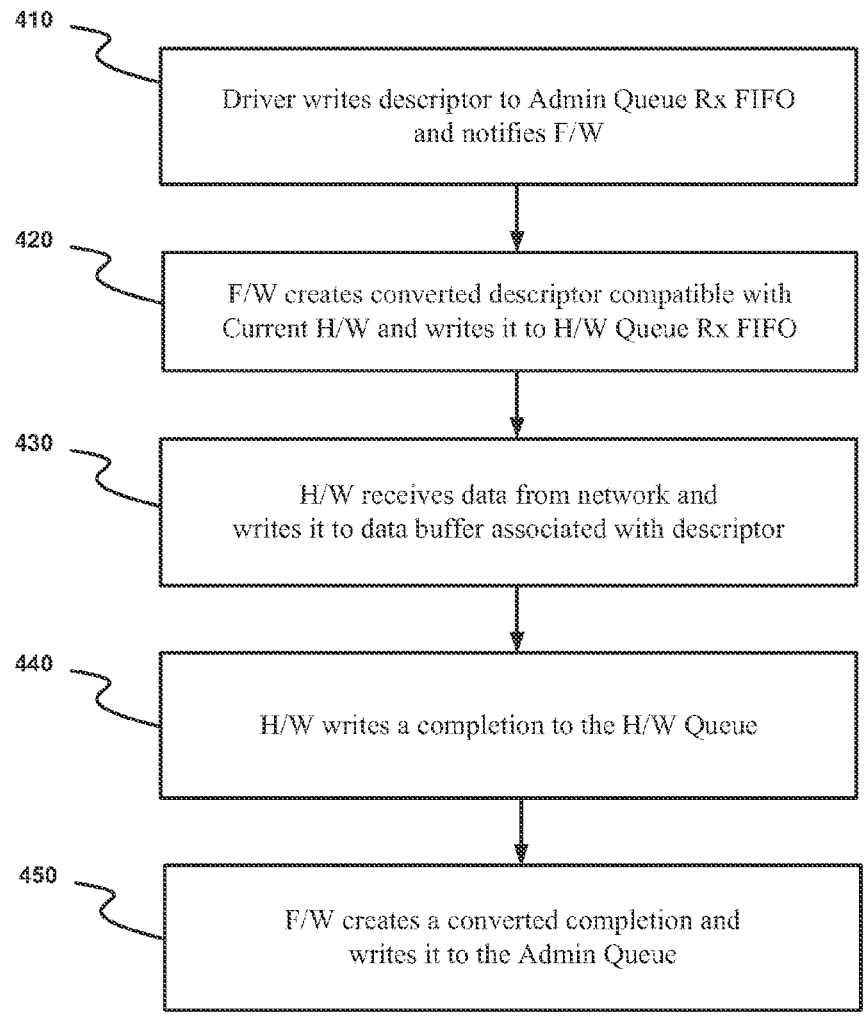
FIG. 4 illustrates a flowchart of operations of another exemplary embodiment consistent with the present disclosure.

FIG. 4 illustrates a flowchart of operations 400 of another exemplary embodiment consistent with the present disclosure. The operations describe the firmware queue abstraction process in connection with the reception of data from the network 106 to the host system 114. At operation 410, driver module 108 writes a descriptor to the admin queue receive FIFO 210 and notifies the F/W module 110. The notification may be accomplished, for example, by updating a tail pointer on the FIFO 210. At operation 420, the F/W module 110 reads the descriptor and creates a converted descriptor that points to the same buffer at which data is to be received, but which is compatible with the current network interface H/W 112. The F/W module 110 writes the converted descriptor to the H/W queue receive FIFO 214 and notifies the network interface H/W 112. The notification may be accomplished, for example, by updating a tail pointer on the FIFO 214.

At operation 430, the network interface H/W 112 receives the data from the network 106 and writes it to the data buffer 204, as specified by the converted descriptor in FIFO 214. Because the data descriptor has been converted to a format compatible with the network interface H/W 112, the data transmission may be accomplished without firmware involvement (i.e., firmware does not need to access the data buffer) or the use of an intermediate data buffer. This may advantageously provide for increased transfer speed and efficiency.

At operation 440, the network interface H/W 112 notifies the F/W module 110 of the transmission. The notification may be accomplished, for example, by writing a completion event to the H/W queue receive FIFO 214. In response, at operation 450, the F/W module 110 creates a converted completion event that is compatible with the driver module 108 and writes it to the admin queue receive FIFO 210. The F/W module 110 may generate an interrupt to notify the driver module 108 that the operation has been completed.

Figure 5:
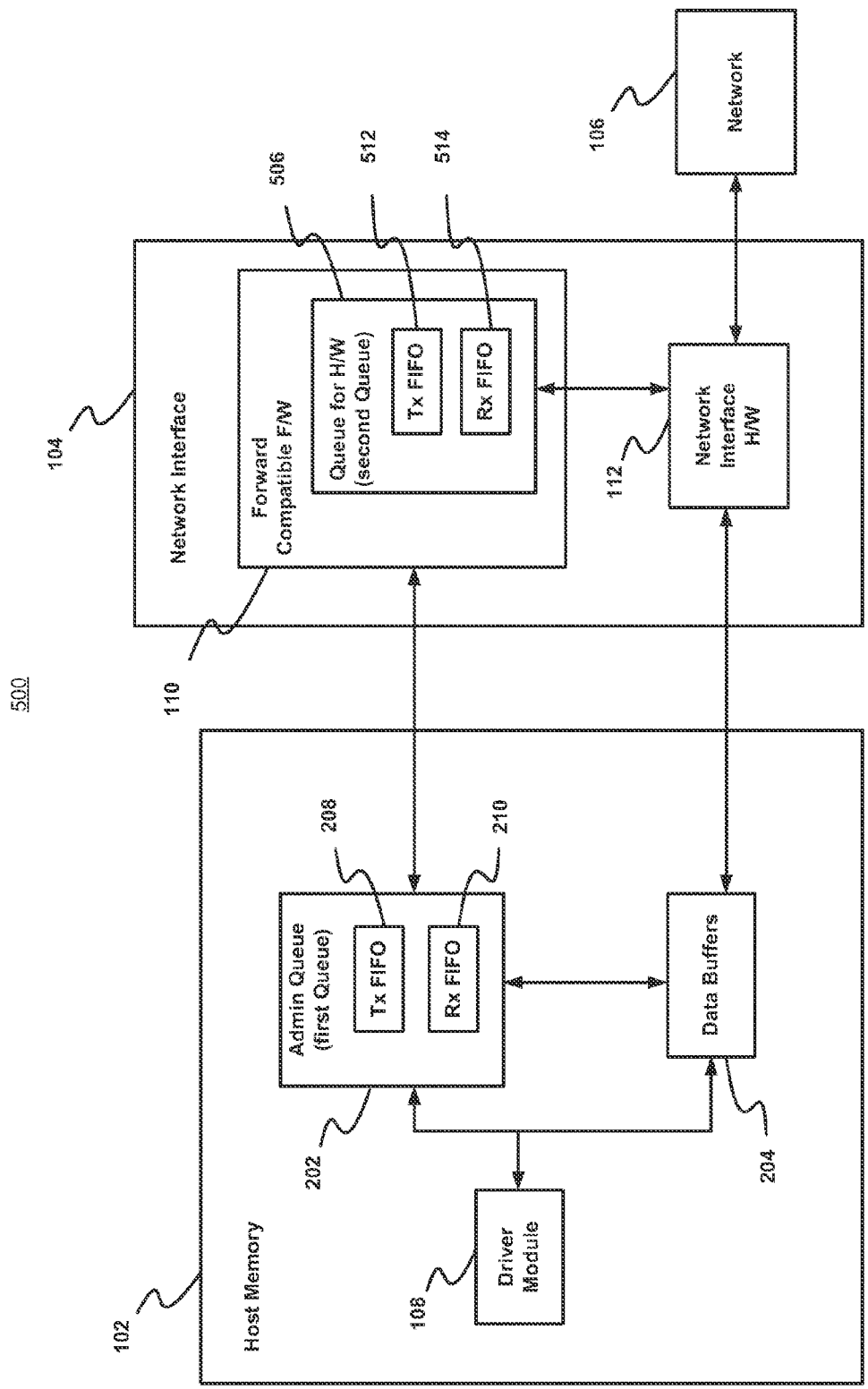
FIG. 5 illustrates a block diagram of another exemplary embodiment consistent with the present disclosure.

FIG. 5 illustrates a block diagram 500 of another exemplary embodiment consistent with the present disclosure. As with the embodiment described in connection with FIG. 2, data buffers 204, may reside in host memory 102 and store data that is transferred through network interface 104. Driver module 108 maintains a first queue (admin queue) 202, which may also reside in host memory 102. The admin queue 202 includes a transmit FIFO (first-in-first-out data structure) 208 through which the driver may post commands and a receive FIFO 210 through which the driver may receive events. The commands and events are descriptors associated with the data in the data buffers 204.

In this embodiment, however, the second queue 506 may reside in memory within the network interface 104 and the F/W module 110 and may thus be inaccessible to driver module 108. This second queue 506 provides a firmware abstraction of the admin queue 202 that is forward compatible with the current version of network interface H/W 112. F/W module 110 may convert and copy descriptors from FIFOs 208, 210 in admin queue 202 to corresponding FIFOs 512, 514 in second queue 506 and/or perform any other operations necessary to provide compatibility between driver module 108 and network interface H/W 112.

In some embodiments, F/W module 110 may be configured to manipulate the network interface H/W 112 to respond as though a descriptor has been posted to a queue without actually doing so. This capability may eliminate the need for a second queue 506 in memory associated with the network interface 104 (in addition to eliminating the need for a second queue 206 in host memory).

In some embodiments, F/W module 110 may batch descriptor conversion operations to be performed at times that allow for increased efficiency. Additionally, or alternatively, descriptor may be pre-fetched, if data buffer addresses are known before hand, for increased efficiency.

Figure 6:
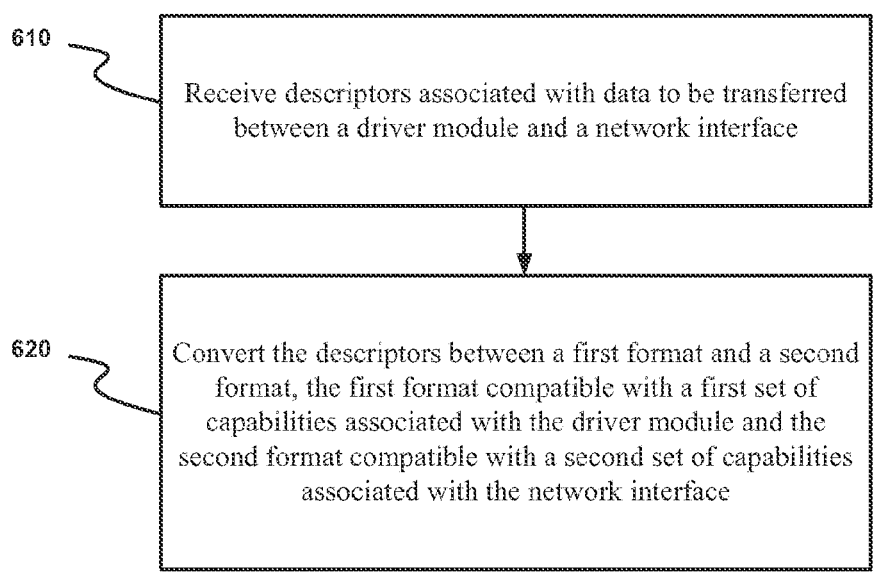
FIG. 6 illustrates a flowchart of operations of another exemplary embodiment consistent with the present disclosure.

FIG. 6 illustrates a flowchart of operations 600 of an exemplary embodiment consistent with the present disclosure. The operations provide a method of forward compatibility between a driver module and a network interface. At operation 610, descriptors, associated with data to be transferred between the driver module and the network interface, are received. At operation 620, the descriptors are converted between a first format and a second format, the first format compatible with a first set of capabilities associated with the driver module and the second format compatible with a second set of capabilities associated with the network interface. In some embodiments, the first set of capabilities may be a subset of the second set of capabilities, and the subset may additionally be a strict subset (i.e., the first set is contained in and smaller than the second set).

Although embodiments of the present disclosure have been described with respect to providing forward compatibility for a network interface through firmware abstraction, it will be appreciated that these methods and systems may be readily adapted to other types of hardware and are not limited to network interfaces.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides a system, method and computer readable storage media for providing forward compatibility between a driver module and one or more present or future versions of a network interface.

The system may include a network interface configured to transfer data between a host system and a network. The system of this example may also include a programmable circuit module associated with the network interface, the programmable circuit module configured to provide compatibility between the network interface and a driver module associated with the host system, and the driver module includes a first set of capabilities and the network interface includes a second set of capabilities.

Another example system includes the forgoing components and the programmable circuit module is further configured to convert descriptors associated with the data between a first format and a second format, the first format compatible with the first set of capabilities and the second format compatible with the second set of capabilities.

Another example system includes the forgoing components and the first set of capabilities is a strict subset of the second set of capabilities.

Another example system includes the forgoing components and the programmable circuit module further provides forward compatibility between the driver module and a plurality of versions of the network interface.

Another example system includes the forgoing components and further includes a first queue configured to store the first format descriptors; and a second queue configured to store the second format descriptors, and the programmable circuit module is further configured to move the converted descriptors between the first queue and the second queue.

Another example system includes the forgoing components and the first queue is in a memory associated with the host system.

Another example system includes the forgoing components and the second queue is in the memory associated with the host system.

Another example system includes the forgoing components and the second queue is concealed from the driver module.

Another example system includes the forgoing components and the second queue is in a memory associated with the network interface.

Another example system includes the forgoing components and the programmable circuit module is further configured to download a driver module update through the network interface.

According to another aspect there is provided a method. The method may include receiving descriptors associated with data to be transferred between the driver module and the network interface. The method of this example may also include converting the descriptors between a first format and a second format, the first format compatible with a first set of capabilities associated with the driver module and the second format compatible with a second set of capabilities associated with the network interface.

Another example method includes the forgoing operations and the first set of capabilities is a strict subset of the second set of capabilities.

Another example method includes the forgoing operations and further includes maintaining a first queue configured to store the first format descriptors; maintaining a second queue configured to store the second format descriptors; and moving the converted descriptors between the first queue and the second queue.

Another example method includes the forgoing operations and the first queue is in a memory associated with a host system for the driver module.

Another example method includes the forgoing operations and the second queue is in a memory associated with a host system for the driver module.

Another example method includes the forgoing operations and the second queue is concealed from the driver module.

Another example method includes the forgoing operations and the second queue is in a memory associated with the network interface.

Another example method includes the forgoing operations further includes downloading a driver module update through the network interface.

According to another aspect there is provided at least one computer-readable storage medium having instructions stored thereon which when executed by a processor, cause the processor to perform the operations of the method as described in the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for providing forward compatibility, said system comprising:
    a network interface configured to transfer data between a data buffer of a host system and a network, said network interface comprising network interface hardware (H/W) and a forward compatible firmware (F/W) module, said F/W module configured to convert descriptors associated with said data and stored in a first format in a first queue maintained by a driver module to a second format stored in
    a second queue that is concealed from said driver module, said converted second format descriptors are forward compatible with said network H/W;
    wherein said data is stored in said data buffer; and
    wherein said network interface is configured to access said data stored in said data buffer directly using said converted second format descriptors.

2. The system of claim 1, further comprising said driver module, said driver module comprising a first set of capabilities and said network interface comprises a second set of capabilities, wherein said first set of capabilities is a strict subset of said second set of capabilities, and wherein said first format is compatible with said first set of capabilities and said second format is compatible with said second set of capabilities.

3. The system of claim 2, wherein said first set of capabilities and said second set of capabilities comprise data transmission and data reception.

4. The system of claim 1, wherein said F/W module further provides forward compatibility between said driver module and a plurality of versions of said network interface.

5. The system of claim 1, wherein said F/W module is further configured to move said converted descriptors between said first queue and said second queue.

6. The system of claim 1, wherein said first queue is in a memory associated with said host system.

7. The system of claim 1, wherein said second queue is in said memory associated with said host system.

8. The system of claim 1, wherein said second queue is in a memory associated with said network interface.

9. The system of claim 1, wherein said F/W module is further configured to download a driver module update through said network interface.

10. A method for providing forward compatibility between a driver module and a network interface, said method comprising:
    receiving descriptors associated with data to be transferred between said driver module and said network interface, said data stored in a data buffer;
    converting said descriptors associated with said data and stored in a first format in a first queue to a second format that is concealed from said driver module, said converted second format descriptors are forward compatible with said network interface; and
    accessing, via said network interface, said data stored in said data buffer directly using said converted second format descriptors.

11. The method of claim 10, wherein said driver module comprises a first set of capabilities and said network interface comprises a second set of capabilities, and said first set of capabilities is a strict subset of said second set of capabilities and wherein said first set of capabilities and said second set of capabilities comprise data transmission and data reception.

12. The method of claim 10, further comprising:
moving said converted descriptors between said first queue and said second queue.

13. The method of claim 10, wherein said first queue is in a memory associated with a host system for said driver module.

14. The method of claim 10, wherein said second queue is in a memory associated with a host system for said driver module.

15. The method of claim 10, wherein said second queue is in a memory associated with said network interface.

16. The method of claim 10, further comprising downloading a driver module update through said network interface.

17. One or more non-transitory computer-readable storage memories having instructions stored thereon which when executed by one or more processors result in the following operations for providing forward compatibility between a driver module and a network interface, said operations comprising:
receiving descriptors associated with data to be transferred between said driver module and said network interface, said data stored in a data buffer;
converting said descriptors associated with said data and stored in a first format in a first queue to a second format that is concealed from said driver module, said converted second format descriptors are forward compatible with said network interface; and
accessing, via said network interface, said data stored in said data buffer directly using said converted second format descriptors.

18. The one or more non-transitory computer-readable storage memories of claim 17, wherein said driver module comprises a first set of capabilities and said network interface comprises a second set of capabilities, and said first set of capabilities is a strict subset of said second set of capabilities and wherein said first set of capabilities and said second set of capabilities comprise data transmission and data reception.

19. The one or more non-transitory computer-readable storage memories of claim 17, further comprising the operations of:
moving said converted descriptors between said first queue and said second queue.

20. The one or more non-transitory computer-readable storage memories of claim 17, wherein said first queue is in a memory associated with a host system for said driver module.

21. The one or more non-transitory computer-readable storage memories of claim 17, wherein said second queue is in a memory associated with a host system for said driver module.

22. The one or more non-transitory computer-readable storage memories of claim 17, wherein said second queue is in a memory associated with said network interface.

23. The one or more non-transitory computer-readable storage memories of claim 17, further comprising the operation of downloading a driver module update through said network interface.

* * * * *